US010438452B2

(12) United States Patent
Ferron et al.

(10) Patent No.: US 10,438,452 B2
(45) Date of Patent: Oct. 8, 2019

(54) LOTTERY VENDING MACHINE CUSTOMIZATION SYSTEM, METHOD AND DEVICE

(71) Applicant: IGT Global Solutions Corporation, Providence, RI (US)

(72) Inventors: Jeffrey Daniel Ferron, Dayville, CT (US); Devin Patrick Kidman, Austin, TX (US); Ira Lough, North Smithfield, RI (US); James Mycroft, Canterbury, CT (US); Medina Marie Topalian, East Greenwich, RI (US)

(73) Assignee: IGT Global Solutions Corporation, Providence, RI (US)

( * ) Notice: Subject to any disclaimer, the term of this patent is extended or adjusted under 35 U.S.C. 154(b) by 424 days.

(21) Appl. No.: 15/239,077

(22) Filed: Aug. 17, 2016

(65) Prior Publication Data

US 2017/0053472 A1 Feb. 23, 2017

Related U.S. Application Data

(60) Provisional application No. 62/205,924, filed on Aug. 17, 2015.

(51) Int. Cl.
*G07F 17/32* (2006.01)
*G06Q 50/34* (2012.01)
*G06Q 30/02* (2012.01)

(52) U.S. Cl.
CPC .......... *G07F 17/329* (2013.01); *G06Q 30/02* (2013.01); *G06Q 50/34* (2013.01); *G07F 17/3211* (2013.01); *G07F 17/3225* (2013.01); *G07F 17/3244* (2013.01)

(58) Field of Classification Search
None
See application file for complete search history.

(56) References Cited

U.S. PATENT DOCUMENTS

2017/0018148 A1* 1/2017 Behm ................... G07F 17/42
2018/0012453 A1* 1/2018 Anderson ........... G07F 17/3267

* cited by examiner

*Primary Examiner* — Damon J Pierce
(74) *Attorney, Agent, or Firm* — Neal, Gerber & Eisenberg LLP

(57) ABSTRACT

A lottery vending machine customization system, method and device includes at least one local client lottery vending machine and a central server, wherein the vending machine has or is in communication with a payment collection apparatus, a ticket internal entry apparatus and a display. The central server is coupled to the local client lottery vending machine over a network, and can be adapted to issue one or more ticket alignment schemes for display on the vending machine display. The central server can also receive status parameter data from the vending machine or the ticket internal entry apparatus, and can issue one or more revised alignment schemes to the vending machine for display.

22 Claims, 13 Drawing Sheets

| Sales Rep Name | Location Name | Location Contact Name | Location Phone Num | Location Address 1 | Core Games Missing | New Games Missing | Top Games Missing | Total Missing |
|---|---|---|---|---|---|---|---|---|
| Alexander Healy | KROGER # 588 | Primary Contact | 6157915348 | 4726 TRADERS WAY | 2 | 4 | 1 | 96 |
| | KROGER # 594 | Primary Contact | 9315602141 | 4900 PORT ROYAL RD | 1 | 4 | 0 | 92 |
| | PUBLIX #1047 | BRENT BERKMANN | 6153024068 | 4935 MAIN STREET | 2 | 4 | 1 | 91 |
| Barney Rubble | FOOD CITY #602 | CLYDE A MINTON | 4235871205 | 1105 EAST MORRIS BLVD | 2 | 4 | 1 | 92 |
| | FOOD CITY #604 | CLYDE A MINTON | 4236233356 | 416 EASTERN PLAZA SHOPPING CE | 2 | 4 | 2 | 93 |
| | FOOD CITY #607 | CLYDE A MINTON | 4235875854 | 2310 SANDSTONE DRIVE | 2 | 4 | 1 | 92 |
| | FOOD CITY #608 | CLYDE A MINTON | 4236397181 | 508 ASHEVILLE HIGHWAY | 0 | 4 | 0 | 92 |
| | FOOD CITY #614 | CLYDE MINTON | 4236237644 | 181 WESTERN PLAZA WAY | 0 | 4 | 0 | 91 |
| | FOOD CITY #646 | CLYDE A MINTON | 4233175008 | 4100 COOL SPRINGS ROAD | 3 | 4 | 2 | 92 |
| Bart Simpson | KROGER # 430 | Primary Contact | 9016038646 | 540 S. MENDENHALL RD. | 5 | 4 | 5 | 94 |
| | KROGER # 439 | Primary Contact | 9017831556 | 4270 SUMMER AVE | 2 | 4 | 1 | 92 |
| | KROGER # 451 | Primary Contact | 9013531649 | 2835 KIRBY PKWY | 2 | 4 | 1 | 92 |
| | KROGER # 452 | Primary Contact | 9013230191 | 3444 PLAZA AVE. | 1 | 4 | 1 | 92 |
| | KROGER FOOD & PHAR. | RANDY WEAVER | 9017654880 | 578 SOUTH PERKINS | 3 | 4 | 2 | 92 |
| | KROGER FOOD & PHAR. | RANDY WEAVER | 9016822989 | 799 TRUSE PARKWAY | 2 | 4 | 1 | 92 |
| Benjamin Ferron | KROGER # 338 | Primary Contact | 9017540354 | 9890 POPLAR AVE | 1 | 4 | 1 | 92 |
| | KROGER # 387 | Primary Contact | 9018531330 | 246 NEW BYHALIA RD | 1 | 4 | 1 | 92 |
| | KROGER # 410 | Primary Contact | 9017562908 | 876 GERMANTOWN PARKWAY | 2 | 4 | 1 | 96 |
| | KROGER # 426 | Primary Contact | 9018241338 | 1675 GERMANTOWN PKWY. | 2 | 4 | 2 | 97 |
| | KROGER # 437 | Primary Contact | 9017583609 | 7942 WINCHESTER RD. | 2 | 4 | 1 | 92 |
| | KROGER # 457 | Primary Contact | 9017511840 | 1238 N. HOUSTON LEVEE RD | 1 | 4 | 0 | 92 |
| | KROGER # 461 | Primary Contact | 9013538279 | 3830 HICKORY HILL RD. SOUTH | 4 | 4 | 4 | 92 |
| | KROGER # 481 | Primary Contact | 9018542705 | 3685 HOUSTON LEVEE RD. | 1 | 4 | 1 | 100 |
| Bill Belichick | KROGER # 523 | Primary Contact | 6154465186 | 143 HENSLEE DR | 2 | 4 | 2 | 92 |
| | LOVE'S TRAVEL STOP #. | ALAN BYRD | 6154412691 | 2971 HWY 48 SOUTH | 0 | 4 | 0 | 95 |
| | PILOT TRAVEL CENTER. | Primary Contact | 9312387180 | 15569 HWY 13 S | 0 | 4 | 0 | 92 |
| | PILOT TRAVEL CENTER. | Primary Contact | 6154464600 | 2320 HWY 48 SOUTH | 4 | 4 | 3 | 94 |
| | PILOT TRAVEL CENTER. | SCOTT KLEPPER | 6157994116 | 1428 HWY 96 NORTH | 2 | 4 | 1 | 95 |
| | PUBLIX #1298 | BRENT BERKMANN | 6153021955 | 8614 CHARLOTTE PIKE | 2 | 4 | 1 | 95 |
| | PUBLIX #1369 | DAVID FULLER | 6157993474 | 7014 CITY CENTER WAY | 2 | 4 | 1 | 95 |
| Bob Barrows | FOOD CITY #676 | CLYDE MINTON | 8655256350 | 1950 WESTERN AVENUE | 2 | 4 | 1 | 92 |
| | FOOD CITY #678 | CLYDE MINTON | 8655841049 | 5801 WSTERN AVENUE | 2 | 4 | 1 | 92 |
| | FOOD CITY #682 | CLYDE MINTON | 8655772898 | 7800 MOUNTAIN GROVE DRIVE | 2 | 4 | 1 | 92 |
| | KROGER # 525 | Primary Contact | 8658920905 | 9501 NORTHSHORE | 0 | 4 | 0 | 92 |
| | KROGER # 531 | Primary Contact | 8655773977 | 4400 CHAPMAN HWY SUITE CC | 3 | 4 | 2 | 92 |
| | KROGER # 870 | Primary Contact | 8655256538 | 4440 WESTERN AVE | 2 | 4 | 1 | 92 |

160

LOTTERY VENDING MACHINE CUSTOMIZATION SYSTEM, METHOD AND DEVICE

TECHNICAL FIELD

The present disclosure relates to a device, method and system for remote lottery vending device customization.

BACKGROUND

Lottery operators (e.g., government lotteries) have traditionally used external lottery processing systems to operate lottery games and process lottery-related transactions. Lottery retailers work with lottery operators to distribute tickets and collect payments, and lottery retailers often earn payments from lottery operators based on selling winning tickets as well as based on overall sales. Further, unattended lottery vending machines (LVMs) have become more pervasive as an alternative vending option to clerk-attended retail locations for various lottery products.

Lottery operators and systems have lacked sophisticated tools to help with LVM deployments and optimizing graphical ticket layouts or alignment schemes, and are currently demanding more retail oversight and insight to support LVM activities and sales. Lottery operators and systems have further lacked centralized interfaces allowing electronic requests or searches through lottery transaction data for LVM business intelligence and operational data, for example. Lottery systems have further lacked operating algorithms or other special programming designed to automatically and dynamically update user displays with real-time LVM sales and other information that can assist with optimizing machine sales performance, which can in turn enable more accurate associated sales forecasts or predictions, such as, for example, forecasting potential sales based on ticket price levels, ticket designs, names or ornamentation.

SUMMARY

In various aspects, the present disclosure addresses a system and method that incorporates programming to provide a user interface with LVM-level transaction information from individual LVMs that may be either standalone or distributed across one or more retailers, retail formats and state lotteries. According to embodiments, systems and methods of the present disclosure provides valuable feedback on lottery product sales and distribution at the LVM level, including retailer type statistics, specific retailer statistics, revenue, geographic metrics and opportunities, among other things. In various aspects, systems and methods described according to the present disclosure can accept state lottery queries via customized or pre-set filters for in depth analyses aimed to facilitate increased sales and optimization of lottery sales performance among LVMs.

In various aspects, the present disclosure provides a framework for advanced lottery transaction information governance, including the specification of decision rights and an accountability framework to ensure appropriate behavior in the valuation, creation, storage, use, archiving and deletion of information. Currently, there are no venues that aggregate LVM-level performance. In accordance with various embodiments, the present disclosure addresses a platform for information governance, normalizing definitions and characteristics of retail trade types, financial settlement terms, and games description among others. Normalization and data governance facilitate the rapid search and analysis of relevant transactional information instrumental in assisting lottery operators in effectively growing their business. Systems and methods according to the present disclosure can be employed by lottery operators (e.g., government lotteries), and can also be used to communicate, plan and report performance with retailers, retail chains and other participants in the lottery environment.

It will be appreciated that aspects of the present disclosure provide strategic performance insights and best practice solutions across retail types, chains, and jurisdictions, and further provide direction for retail expansion efforts, with trade type and chain performance across multiple jurisdictions, for example. Aspects of the present disclosure further provide increased speed in analysis, accommodating centralized as well as jurisdictional requests. Aspects of the present disclosure further enable improved operations management efficiency, improved retailer negotiation leverage due to a normalized view of performance, and actionable best practice recommendations for relevant management personnel to facilitate immediate performance improvement.

According to various aspects, a lottery vending machine customization system includes at least one local client lottery vending machine and a central server, wherein the vending machine has or is in communication with a payment collection apparatus, a ticket internal entry apparatus and a display. The central server is coupled to the local client lottery vending machine over a network, and can be adapted to issue one or more ticket alignment schemes for display on the vending machine display. The central server can also receive status parameter data from the vending machine, such as how many tickets of a given game or price level have been sold, or operational/mechanical issues, for example. Based on status parameter data, the central server can issue revised alignment schemes to the vending machine for display.

The central server can be a local server onsite with the one or more LVM machines, or can be a remote server that is not onsite. A user interface can be coupled to the central server to permit a user to select one or more pre-set alignment schemes or an algorithmically determined alignment scheme, as well as to permit a user to manually drag-and-drop or otherwise manually manipulate ticket game offerings as part of a manually created alignment scheme. Different alignment schemes can be dynamically applied to different vending machines, whether the machines are in the same location or dispersed in different locations.

The alignment schemes can be presented so as to affect the visual layout of available tickets on the vending machine display, without requiring manual changes to the bins within which the tickets reside on the inside of the vending machine. Further, a ticket internal entry apparatus provided in communication with the vending machine can, in one embodiment, scan ticket packs as they are physically loaded into the machine to ensure appropriate games are loaded, such as when previous ticket packs are depleted, or in response to directives received from the central server to load specific ticket packs, for example.

BRIEF DESCRIPTION OF THE DRAWINGS

FIGS. 4 through 14 are exemplary user interface displays in accordance with aspects of the system and method disclosed herein.

DETAILED DESCRIPTION

Figure 1:
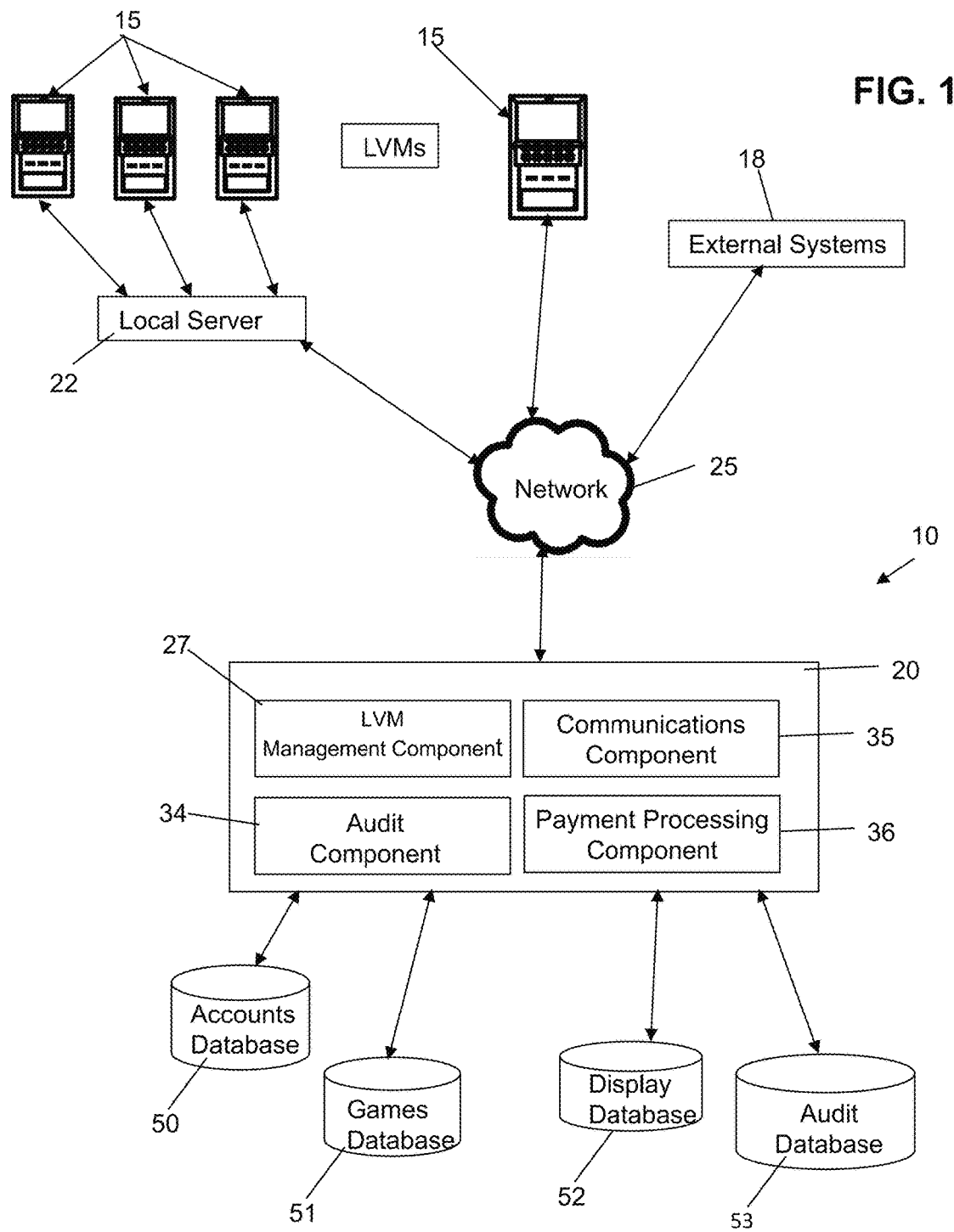
FIG. 1 is a sample architectural diagram illustrating components associated with embodiments of the system and method disclosed herein.

With reference to the system 10 in the embodiment shown in FIG. 1, and depending upon the implementation, a wager request may be received at a lottery vending machine (LVM) device 15 and then transferred to a central server 20. It will be appreciated that system 10 can be deployed with direct connections from central server 20 to a device 15 via network 25, as well as indirect connections from central server 20 through a local server 22. In various embodiments, the central server can be embodied by the local server 22. Processing of the actual transaction request can occur at the central server 20, local server 22 or another server associated with transaction and wager processing for the selected ticket, including any loyalty and related player account details, for example, and such processing will not be described in substantial detail herein. At a minimum, though, server 20 and/or server 22 processes data about the transaction for use in LVM-level analysis.

In various embodiments, the system and method disclosed herein can operate with one or more vending units 15 in networked connection with server 20, as shown in FIG. 1 and described elsewhere herein. The server 20 can provide instructions to the one or more vending units as the vending units carry out their designed functions. In various embodiments, the server 20 can be provided with various components or aspects, such as an LVM management component 27, a communications component 35, a payment processing component 36, an audit component 34 and other components. Such components can comprise, for example, software programming stored in one or more databases to be executed by one or more processors to carry out the processes and functions described above.

In various embodiments, the LVM devices 15 include at least one processor, memory and software programming stored in memory and executable by the at least processor to conduct various operations required by the LVM devices. For instance, the LVM devices 15 include programming to process codes associated with unpurchased tickets being loaded into physical bins within the device. The codes can be read, according to various embodiments, by a scanner provided as part of, or in communication with, each LVM device 15. The scanner can be a commercially available optical scanner capable of scanning barcodes, for example. In various other embodiments, the device 15 can be provided with a user interface, such as a touchscreen or other computing device with a visual display, for example, that permits a user to manually designate the ticket packs being inserted into a machine, among other things. Such manual designation can involve a user typing in an alphanumeric code from a given ticket pack to be loaded into the device, for example. Whether scanned or manually entered, information about a ticket pack being loaded into a given device 15 is sent to central server 20. The scanner and the computing device for manual entry are examples of a ticket internal entry apparatus associated with the LVM device 15.

The LVM devices 15 further include programming to process financial transactions for purchasers of tickets, process received inputs, display appropriate visual and auditory displays through respective speakers and visual displays, and operate ticket processing functions, such as bursting and tearing tickets from ticket rolls within the LVM devices. The LVM devices 15 can further include programming to display appropriate icons, informational content and entertaining animations in order to provide a functional and visually appealing interface for purchasers. Depending upon embodiments being employed, the LVM devices 15 may operate according to locally stored instructions, or may operate based upon instructions received from the server 20 or server 22.

Figure 2:
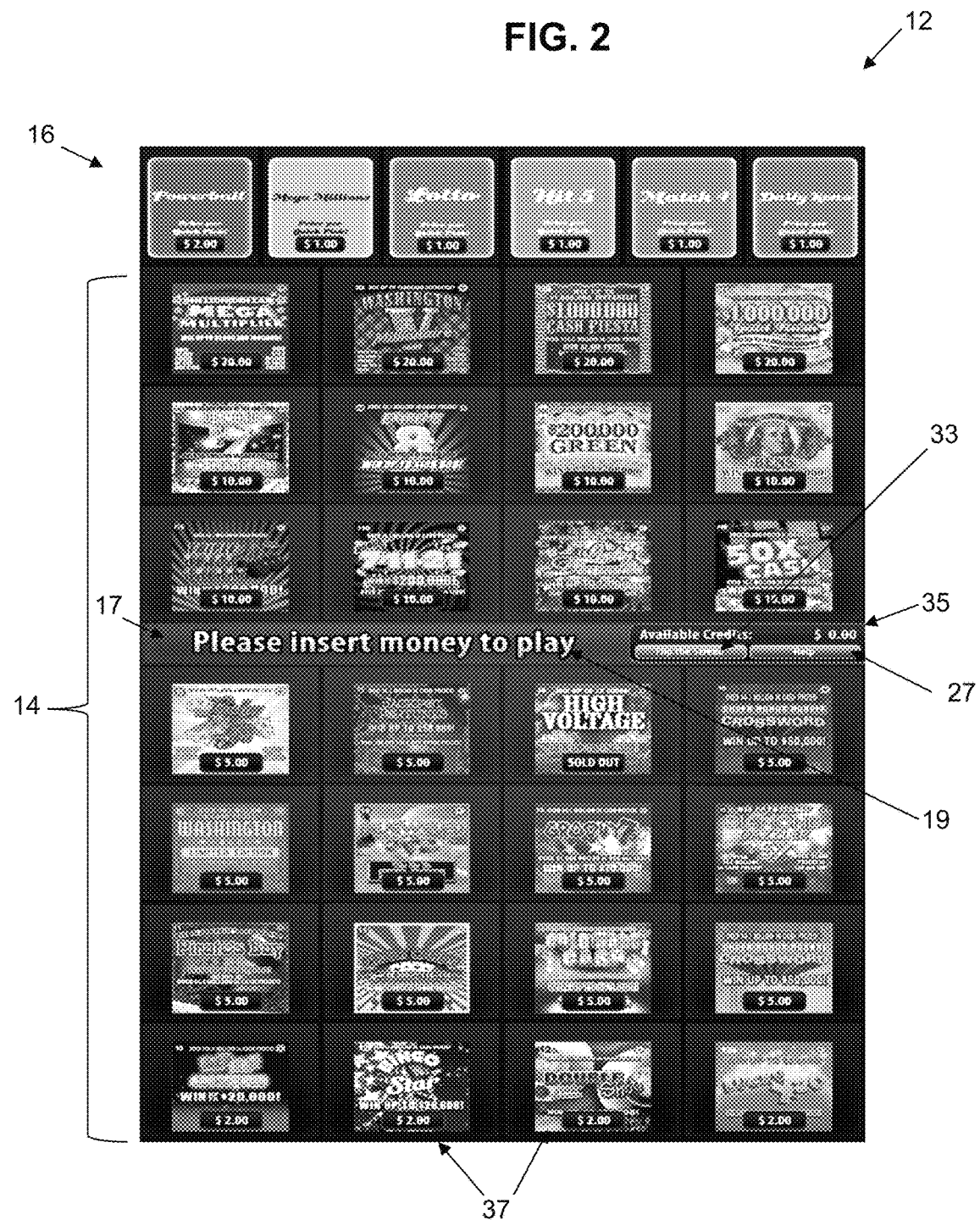
FIGS. 2 and 3 are exemplary LVM interface displays showing tickets available for sale, wherein the tickets are arranged according to a planogram associated with embodiments of the system and method disclosed herein.

As shown in FIG. 2, the LVM device touch-screen communications interface 12 can be configured, for example, to receive input and display output. For example, the interface 12 can display instant ticket game selection options 14 and draw-based ticket game selection options 16 for selection by a purchaser. For draw-based games, the display can receive input from a purchaser indicating that the purchaser wants to select his or her own numbers, and can further receive input from a purchaser indicating that the purchaser would like the numbers randomly selected, such as by central server 20. The LVM device 15 can further include a payment collection apparatus and a ticket dispenser tray. Generally, a suitable payment collection apparatus is provided on each LVM 15, and such component can process cash, credit, debit, cashless, ticket-based, loyalty reward/redemption and other forms of payment, for example. Such components can be provided in the form of one or more bill collectors, coin collectors, magnetic stripe readers, chip readers, RFID tag readers and other known devices for receiving and processing payments. The LVM devices 15 can further include respective ticket collection trays for receiving tickets dispensed by the device.

As further shown in display 12 of FIG. 2, a banner 17 is provided that houses the terminal prompts/call-to-actions/messaging area 19, the terminal credits 27, and functional buttons (e.g., 33, 35). The functional buttons can include functions such as LANGUAGE (to change the language), HELP 35, and FLIP SCREEN 33, which allows the purchaser to change the arrangement of ticket game icons (e.g., 37). These buttons can be positioned just below the physical center of the screen, vertically, but can be re-positioned elsewhere, in various embodiments of the display.

In addition to receiving player payments, an LVM device 15 can receive a wager request from a player, including the selection of a desired game, ticket design, number of tickets, wager level, prize structure or other selection. Such selections can be made through touching one or more user inputs on interface 12, for example. Once a payment and ticket selection have been received by the device 15, an internal communications component on the LVM can send the information to local server 22 directly, and/or to remote central server 20 via network 25. In the latter example, the communications component 35 of the central controller 20 receives the specific inputs and game data that have been transferred. The data can be collected and automatically populated into user displays, or alternatively, the data can be entered manually into one or more computer systems operating programming according to the system of the present disclosure. In one embodiment, the data is collected in .xlsx format. The communications component 35 operates to communicate with the vending devices 15 and external systems, devices and/or providers 18 over network 25 to perform functions in accordance with the embodiments of the present disclosure. For example, if a user desires to publish information associated with the operation of the system of the present disclosure to a lottery operator website, the communications component 35 can operate to send the information to a suitable external system 18 for appropriate action. It will be appreciated that local server 22 can be provided with a similar communications component to the component 35 associated with server 20 and, in various embodiments, can act as the central server, i.e., a substitute or alternative option for carrying out all of the processing and functions of server 20 described herein.

Data cleansing and/or ETL (extract, transform and load) operations can also be performed on the collected data by server 20 and/or 22. In this operation, the collected data can be supplemented, standardized, normalized, corrected, de-specified and/or otherwise treated in order to ensure accuracy and presentation in usable form, for example. Retailer business types can be segmented, game types and game names can be identified, and competitive and demographic data from various internal and external sources (e.g., census, Nielsen™, Hoover™, Directory of Convenience and Supermarket Stores™, etc.) can be evaluated and incorporated with the collected data for more in-depth insight, for example. The collected and cleansed/ETL'd data can be filtered and processed by a lottery information management system, such as system 10, for example. The lottery management system can filter or process the data by efficiently storing it, managing permissions, and providing algorithms and other data manipulation programming to facilitate the various functions and purposes disclosed herein. In various embodiments, the data can be stored using a landscape management database and/or resource planning software, optionally provided by an enterprise resource planning (ERP) software program, such as that provided by SAP AG of Germany. In addition to raw sales, the data can be linked to other relevant lottery-related information such as jackpots and game attributes, for example, for correlation, causality and forecasting, for example. In this way, the system can provide a robust platform for queries and analytics, incorporating retailer, game level, and player level detail, as well as third party data, for optimized accuracy, relevance and insight.

In addition, the system 10 can provide user interfaces permitting analysis of the underlying stored data, such as through queries that can elicit customized responses depending upon (1) the user, (2) programmed analytics algorithms in accordance with embodiments of the present disclosure and (3) the underlying stored data. Such user interfaces can be considered examples of external systems 18 in FIG. 1, and can include personal computing devices, including desktops, laptops, smartphones, tablet PCs and other fixed and mobile computing and/or communications devices. As an example of a user interface, a lottery operator in a specific jurisdiction may desire to know how LVMs from a retail chain or trade type are performing relative to LVMs at other stores/locations in one's own state or compared to similar chains or trade types in other states. Embodiments of the system disclosed herein can accept such a request, process the request against stored data, and return text, charts, displays and other multi-media graphics in presenting an answer to the user's query. Such returned information can be displayed on a graphical user interface of the user's computing device, for example. In various embodiments, the system of the present disclosure can employ visualization software and data modeling/statistical software in processing requests and presenting results and analysis.

As further shown in FIG. 1, the central server 20 can be provided with various software components such as, for example, LVM management component 30, communications component 35 and audit component 40. These components can access and employ various databases for storing and retrieving data in accordance with the desired functions of the system and method of the present disclosure. Databases can include, for example, an accounts database 50, a game database 51, a display database 52 and an audit database 53. The accounts database 50 can store information related to player accounts, including player identification details, player usage and transaction history, player preferences, player financial information and account details and other information. The game database 51 can store information pertaining to available games for selection and deployment, including graphic designs, indicia, scratch-off locations, available wager amounts, odds and other game-related elements. The display database 52 can store a library of displays to be presented on the interface of the vending device 15, including player selection options (for touch-screen selection) as well as visual outcome displays or animations employed during inactive periods or for entertainment during player use. The display database 52 can also store configuration options, algorithms for planogram displays on LVM display screens (such as display 12 in FIG. 2), and other elements. A planogram can be considered to be a visual tool typically used in retailing that defines where and in what quantities various commercial offerings are placed in a retail display. Thus, in the LVM context, embodiments described herein can provide programming that can produce static or dynamic planograms for implementation on one or more LVMs. For example, an algorithm may operate according to aspects of the present disclosure so as to populate ticket offerings within a given LVM that increase specific tickets or games that are known to be best sellers in an effort to increase sales.

With regard to other databases shown in FIG. 1, audit database 53 can store information such as device-specific statistics to permit lottery service providers (LSPs), lottery operators and retailers to better understand device usage, including game-related statistics, ticket volumes, retailer statistics and other information that can assist in better servicing players, increasing revenue and overall management of devices. Among other things, the real-time processing, in addition to providing visualization for optimizing LVM performance, provides the capability for a more advanced, accurate algorithm for calculating lost sales estimates. Historically, most machines have extrapolated lost sales based on percentage of hours not selling. With real time data, average sales by hour by day of week by business type (e.g. Saturday between 12-5 p.m. versus Sunday night at 10 p.m. in a grocery store) can be calculated in accordance with aspects of the present disclosure. In this way, and knowing which hours the machine is down, one can use the already calculated averages for those time periods and day of week to present the end-user with accurate lost sales estimates, among other things.

The specific software components described herein can comprise computer-readable instructions stored in suitable memory and operable by one or more processors to perform the functions necessary for operation of the embodiments of the present disclosure. For instance, the vending device management component 30 can operate to deliver instructions to the vending devices 15 for operation, including, for example, what tickets to display on the graphical user interface, what format to use in the display, what customer interaction data to collect and other instructions. Such instructions can be generated using programming that generates one or more planograms, for example, as described elsewhere herein.

In traditional non-touch vending solutions, the physical location of a game within a particular bin (identified by a bin number) defines the position of the game within the user interface, and this is called "One-to-One" mapping. Also, a suggested game display layout (planogram) is delivered from a lottery provider to a retailer with the physical instant tickets, with the planogram typically in hard copy form. The intention of supplying the planogram is to have the games positioned optimally to maximize sales; however, there are no consistent controls in place to verify alignment with the lottery-assigned planogram. Employing a dynamic planogram in accordance with aspects of the present disclosure offers the ability to create a planogram/alignment scheme or alter the screen position of a game within a planogram independently of its physical bin location ("One-to-X" mapping) using a planogram creation tool as described herein. In various embodiments, the planogram creation tool can exist in two forms: a remotely accessed tool, to be used by marketing analysts and instant ticket product managers, for example, and a machine level tool, such as a touchpad or other computing device that resides on or with the self-service device, wherein the device has a visual display and can be used by retailers and sales representatives, for example. Using the remote planogram creation tool provided in accordance with aspects of the present disclosure, a planogram can be defined, grouped, assigned and scheduled for download, for example. The machine level tool can, in various embodiments, allow a retailer or sales representative to alter screen position of games that are physically loaded in the machine. Regardless of user or device employed, the planogram tool comprises programming permitting customization of a lottery vending machine display.

In various embodiments, the dynamic planogram component of the present disclosure can enable the lottery provider to enforce adherence to a planogram and measure the percentage compliance through the use of performance reports which can be produced by the audit component or other business intelligence management component associated with the present disclosure, for example. It will be appreciated that the system disclosed herein has knowledge of each machine's planogram based on the inventory that has been loaded into the self-service device through a ticket entry apparatus, such as a scanner for scanning of a barcode on the pack of instant tickets which contains various game parameters, for example. The initial or first planogram is the original alignment scheme of ticket representations on the LVM display, such as scheme 39 of FIG. 3. Status parameters can be tracked during operation, including operational parameters such as whether the machine is receiving electrical power, whether device bins are operational or in need of repair and other mechanical status information. Status parameters can also include ticket pack status parameters, which are established and tracked for facilitating the operations disclosed herein. Such status parameters can reflect, for example, that a ticket pack has just been loaded and is 100% available, that a ticket pack is fully depleted and is 0% available, or that a specific number or percentage of tickets in the pack are available for purchase at the LVM device in which they have been loaded. The percentage or number available parameter is derivable through awareness of the number of tickets in a given pack sold by a respective LVM, and such data is learned in the course of active operation of the LVM device as described herein. Upon analysis of the various reports, action can be taken by a lottery operator or service provider to ensure that compliance performance and sales are optimized.

Figure 3:
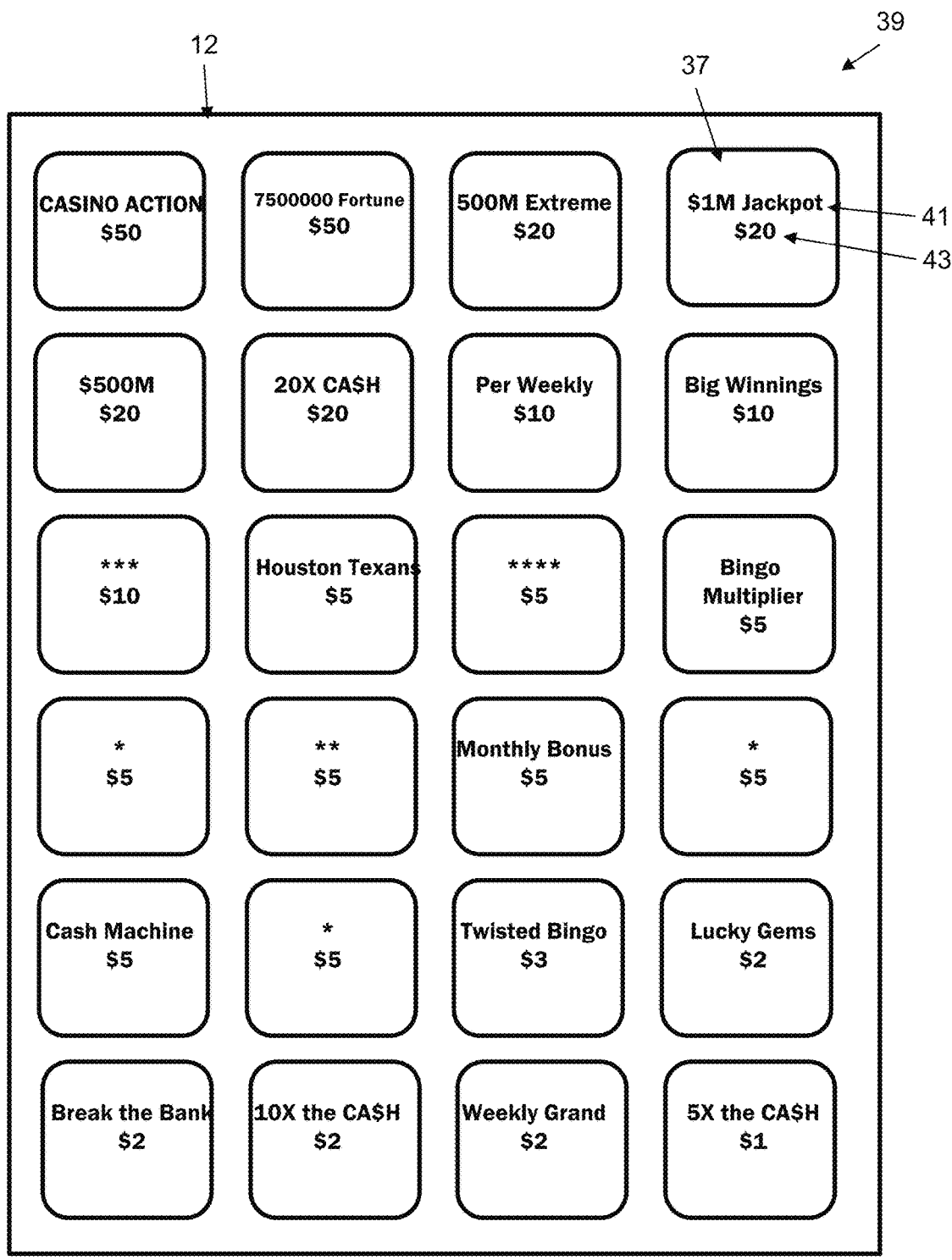
Figure 4:
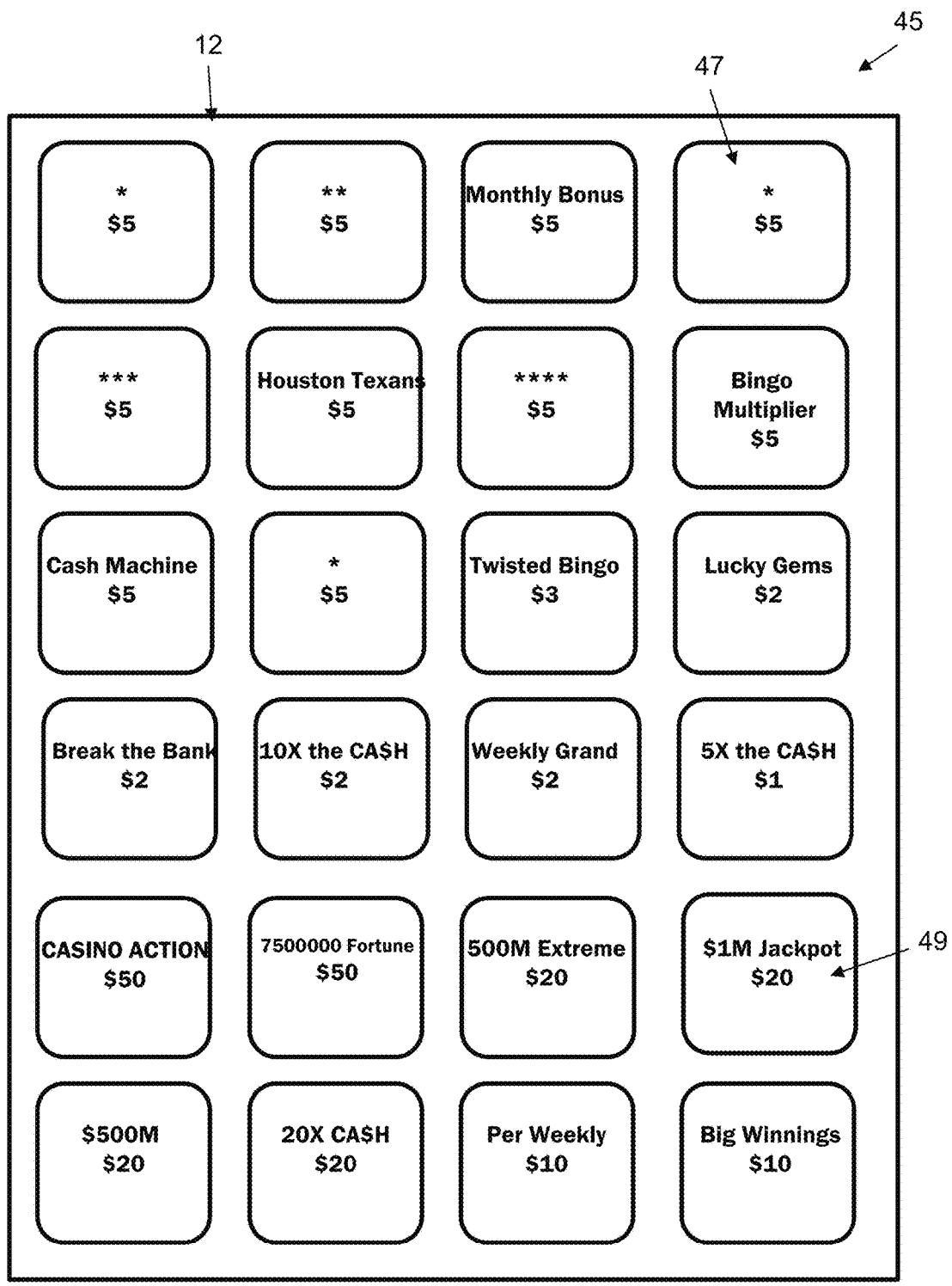

In various embodiments, the arrangement or alignment scheme of the ticket purchase options can be changed over time, regardless of the arrangement of the physical tickets in the bins inside the vending devices. For example, FIG. 3 illustrates a first alignment scheme 39 of the ticket options for a given vending device. As shown therein, each ticket representation (e.g. 37) includes a game name 41 and an associated price 43. In FIG. 3, the higher priced tickets are generally positioned closer to the top of the display 12, whereas the lower priced tickets are generally positioned closer to the bottom of the display 12. In some cases, this arrangement or alignment scheme 39 may be desirable so as to keep the higher priced tickets closer to the eye level of prospective purchasers, as higher priced tickets lead to higher revenues. In other cases, this alignment scheme 39 may be less desirable. For instance, in a jurisdiction where $5 tickets are very popular, re-aligning the scheme such that the $5 tickets are at eye level of prospective purchasers may lead to greater sales of the $5 tickets. As shown in FIG. 4, for example, a second alignment scheme 45 is shown on display 12, wherein the lower priced tickets (e.g., 47) are placed above the higher priced tickets (e.g. 49). Changes to the alignment scheme can be downloaded by an LVM device when there is an inventory change (e.g., a game becomes sold out, a new game is loaded, more packs of the same game are loaded, etc.), when the LVM device is first signed on, when notice of a newly scheduled alignment scheme is received or in other situations. In various embodiments, the LVM device can send an inventory status to the central server 20, which can analyze the LVM device's current inventory against a currently assigned assignment scheme, and then make any modifications to the assignment scheme based on desired optimization so that no ticket bins are empty. The new assignment scheme is a calculated planogram that replaces an original or previous planogram.

The audit component 40 processes, among other things, statistics and analytical information, to and from audit database 53. Such information can be employed by external systems 18 such as an external administrative operator, or by local systems, such as system 22, which can be a retailer operation controlling multiple devices 15 as shown in FIG. 1, for example.

Figure 5:
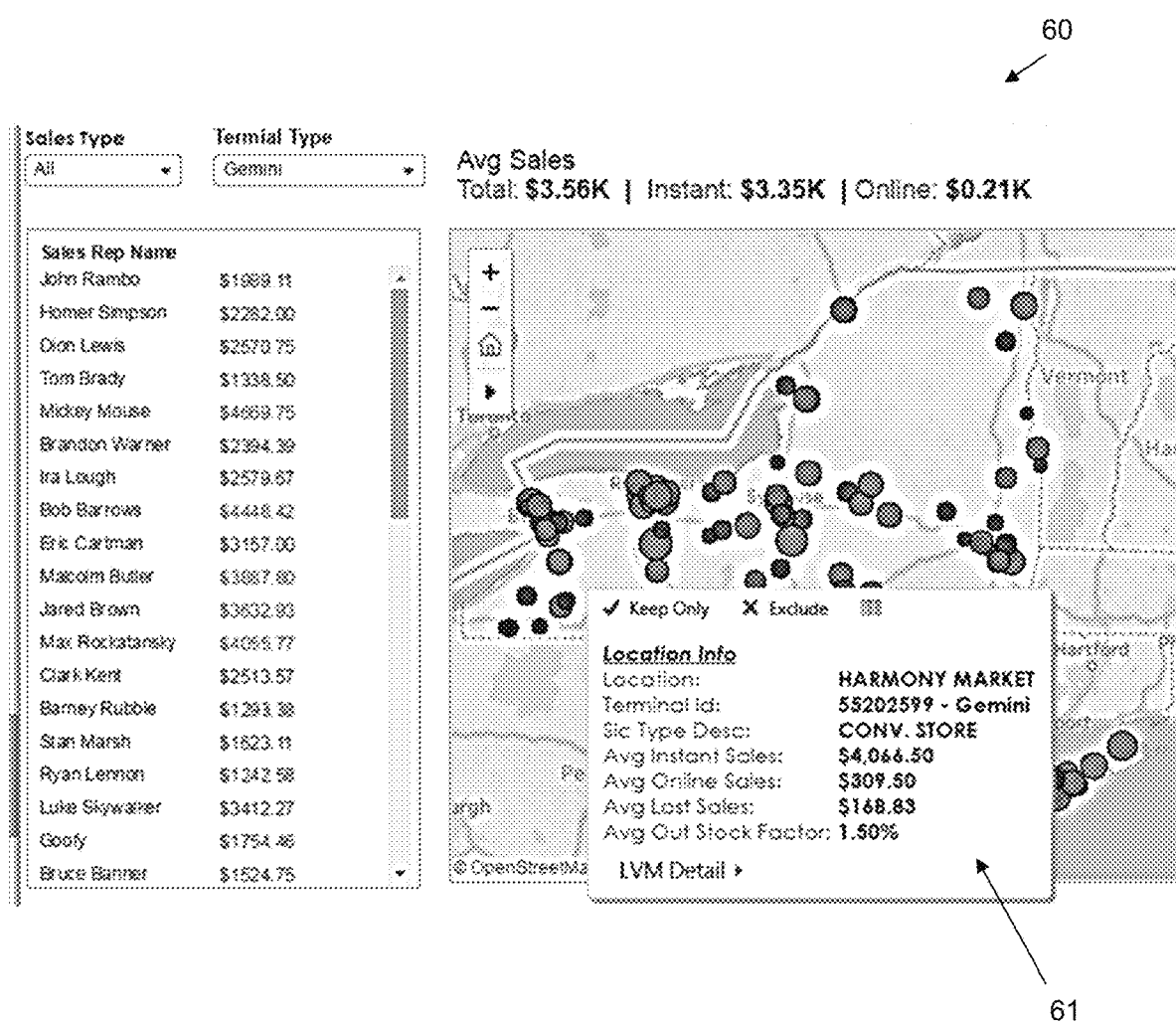

As shown in the exemplary administrative display 60 in FIG. 5, an overview of sales at various LVM devices can be shown in the form of a map, including details of where various devices are located, as well as statistical information, including sales amounts per device, sales amount per type of game, sales amounts per representative and other information. In various embodiments of the present disclosure, the map and statistical data can be color-coded to show performance (e.g., green for positive sales and red for negative sales). The map can further be interactive in the sense that a user can point to or "mouse over" a representative indicia to gather statistics about a particular device, for example. For instance, as shown at window 61, details about a specific device such as the device location, terminal key number, the "SIC" or industry code for the type of retailer, the average weekly instant sales and average weekly online sales can be shown.

Figure 6:
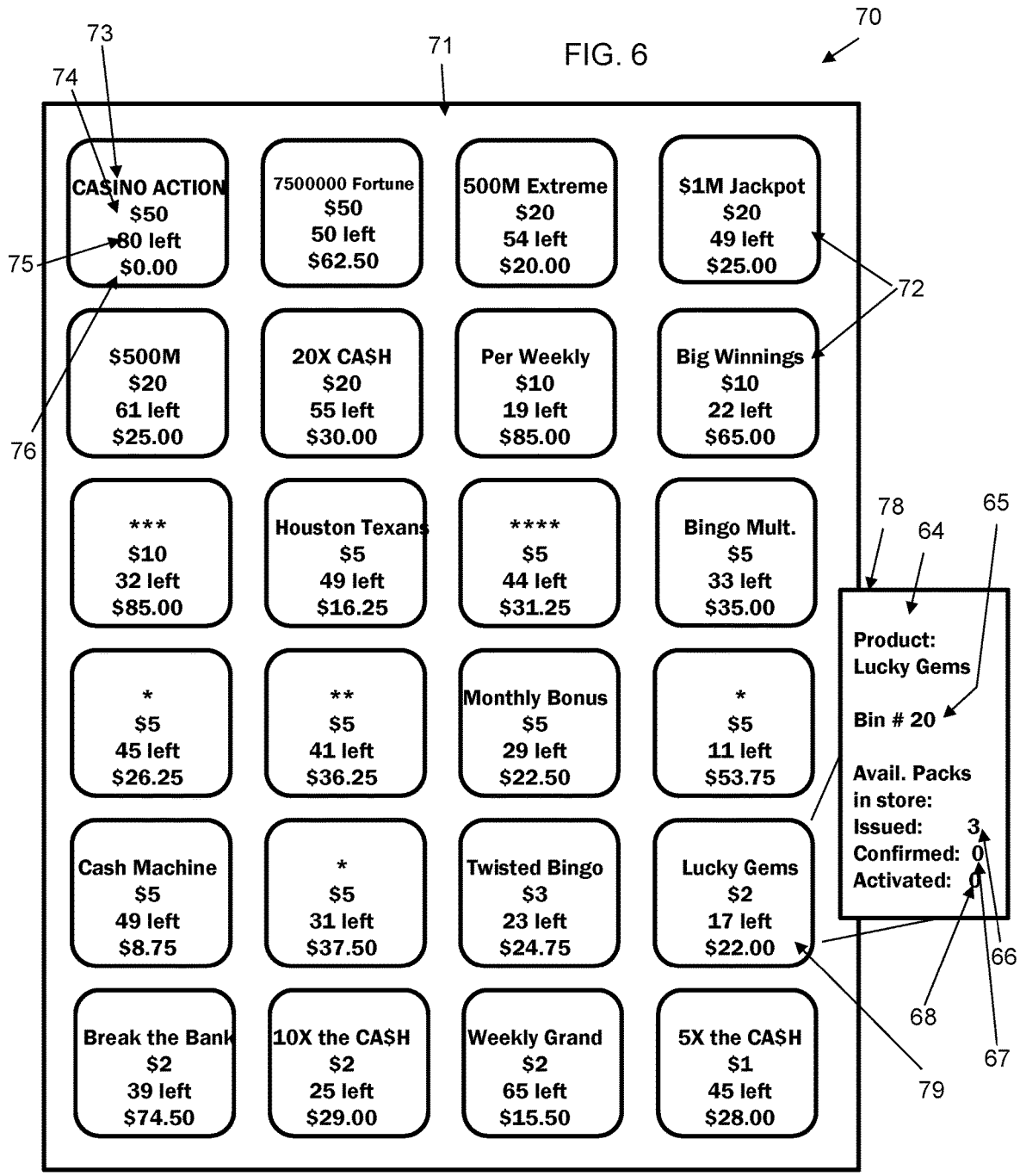

As shown in the exemplary administrative display 70 in FIG. 6, a representation 71 of a specific LVM display can be provided on the user interface. This display shows, for example, the physical bin status (inventory) graphically as an image of the actual machine. Thus, for example, if there are twenty-four available games at the particular LVM represented by display 70, the user can see which games are available (e.g., 73), the ticket price point (e.g., 74) for each game, the inventory (e.g., 75) of tickets remaining for each game, and the amount spent (e.g., 76) at the LVM machine on each game over a given period of time (e.g., one day). In various embodiments, performance information at the LVM can be dynamically updated within the image in real time. In such embodiments, the communications component 35 receives data and passes it to audit component 40 for display, for example, such as on a display of an external device 18. The system can operate to automatically update the information as it is received from a given LVM, or can operate to allow the user to designate update frequencies, or even handle updates manually by refreshing his or her screen, for example. In various embodiments, the audit component 40 can communicate with management component 30 to reorganize a display, re-set ticket options to influence sales and otherwise assist with the management of given LVM devices being reviewed. It will be appreciated that this display 70 can further represent the game position on the touchscreen graphically, reflecting the inventory in the LVM machine irrespective of bin location. Upon reviewing such a display, for example, a user may determine that a second alignment scheme is desirable in order to positively influence sales for a given LVM device, in order to comply with a designation from a retailer family or other entity, or in order to adapt to available inventory, for example. Accordingly, the user can select one or more pre-set alignment schemes, an algorithmically determined alignment scheme, and/or the user can manually drag-and-drop or otherwise manually manipulate ticket game offerings as part of a manually created alignment scheme.

Figure 7:
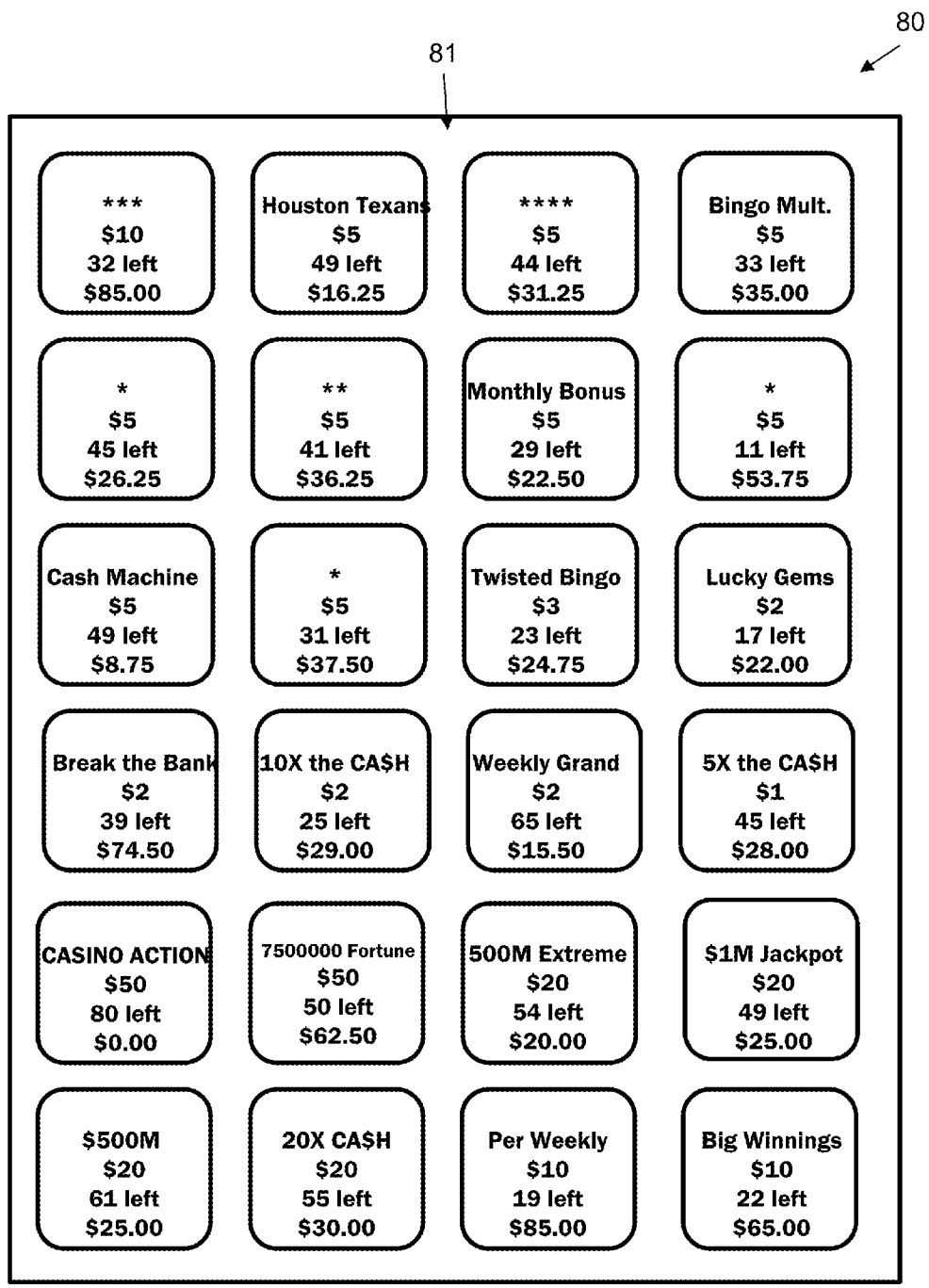

Different alignment schemes can be dynamically applied to different vending machines, whether the machines are in the same location or dispersed in different locations. For example, display 80 in FIG. 7 shows a re-organized alignment scheme 81 that is different from scheme of FIG. 6. Additionally, the visual displays 70, 80 can appear as shown in FIGS. 6 and 7, respectively, or may be represented such that different information is displayed based upon user interaction. For example, a user may "mouse over" or "hover over" an area on the display with a mouse-type input device, at which time additional information can be displayed that relates to the location of the mouse on the display. For instance, as shown in FIG. 6, pop-up window display 78 reveals the bin number 64 of the device where the tickets are physically stored, the name 65 of the game involved, the number of packs 66 issued and available in the store, the number of packs 67 confirmed to have been loaded in the store and the number of packs 68 activated by either scanning or manual methods, as described elsewhere herein. Such information can assist with ticket sales optimization, device operational management and/or retailer compliance. For example, if a given bin is empty, but the retailer has packs of tickets onsite, the retailer can be notified to obtain the ticket pack from local inventory, and activate it as it is loaded into the device. Further, if a ticket bin is empty, there may be a mechanical problem such that the retailer can be notified to take appropriate remedial action. Further, if a planogram has been presented to the retailer for installation, and the retailer has not complied, the display can assist a remote user in monitoring the retailer, and sending communications as appropriate based on the retailer's compliance or non-compliance.

Figure 8:
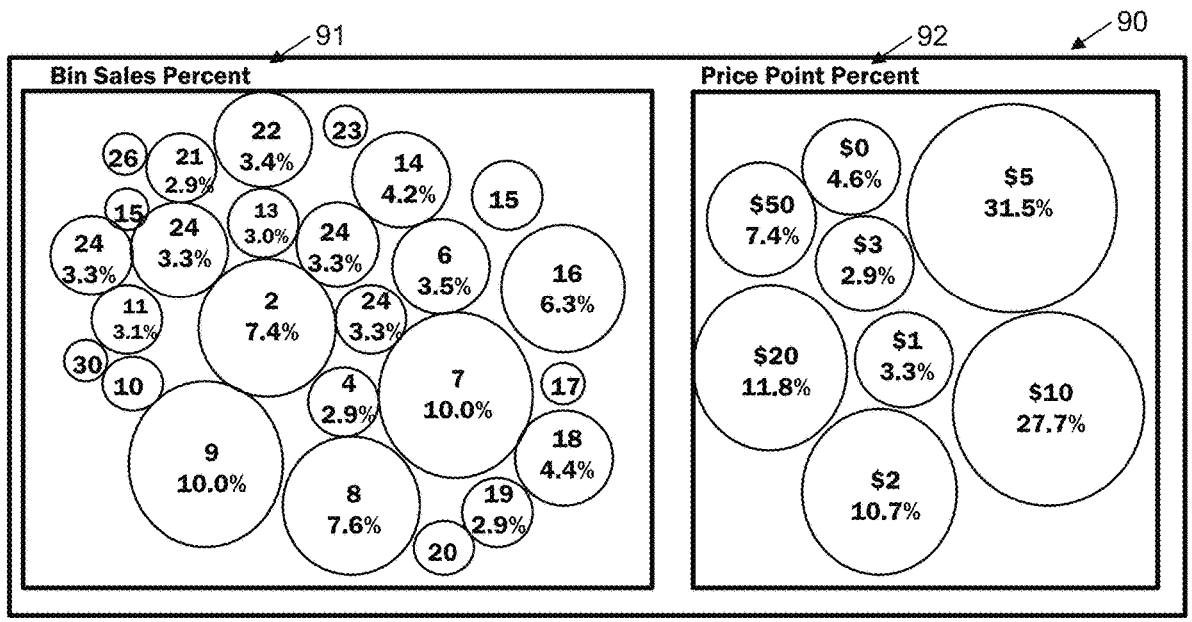

As shown in the exemplary administrative display 90 of FIG. 8, sales data can be represented for the administrative user, including bin sales percentages 91 among the different bins for an LVM device, as well as ticket price sales percentages 92 among the different price points for tickets offered through an LVM device. For instance, the $5 ticket price level may sell the highest percentage, as shown at 93, and the $3 ticket price may sell the lowest percentage, as shown at 94. Such information and graphical displays can assist the administrative user and the lottery operator in better understanding what items sell the best. It will be appreciated that the visual representations for sales percentages (e.g., 91, 92) can be represented in various forms of graphs, including bar graphs, pie graphs and other forms.

Figure 9:
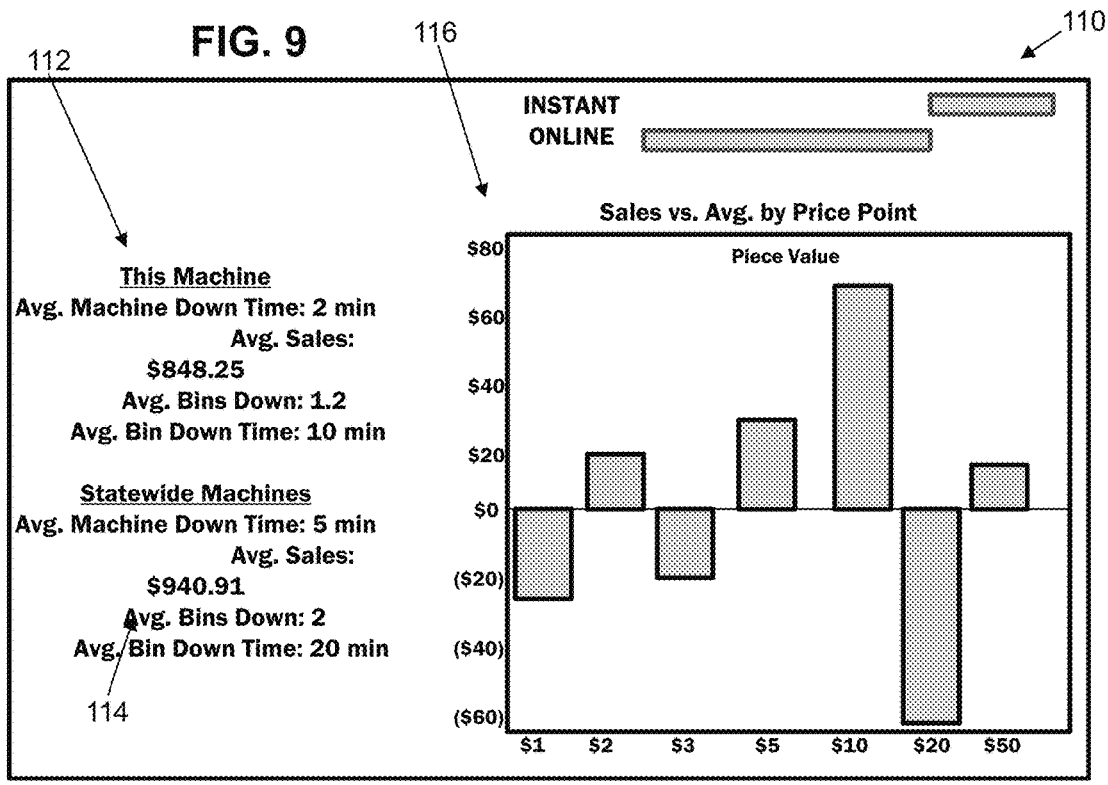

As shown in the exemplary administrative display 110 in FIG. 9, a further representation of data pertaining to a specific LVM display can be provided on the user interface 110 for the administrative user. In the display 110, details such as average machine down time, average sales, average bins down, average bin down time can be provided on a machine-specific basis (e.g., at 112) or a state-specific basis (e.g., at 114), for example. Additionally, sales data can be provided for a specific LVM in comparison to state-wide sales for multiple price points for tickets available for sale through the LVM, such as at 116, for example.

Figure 10:
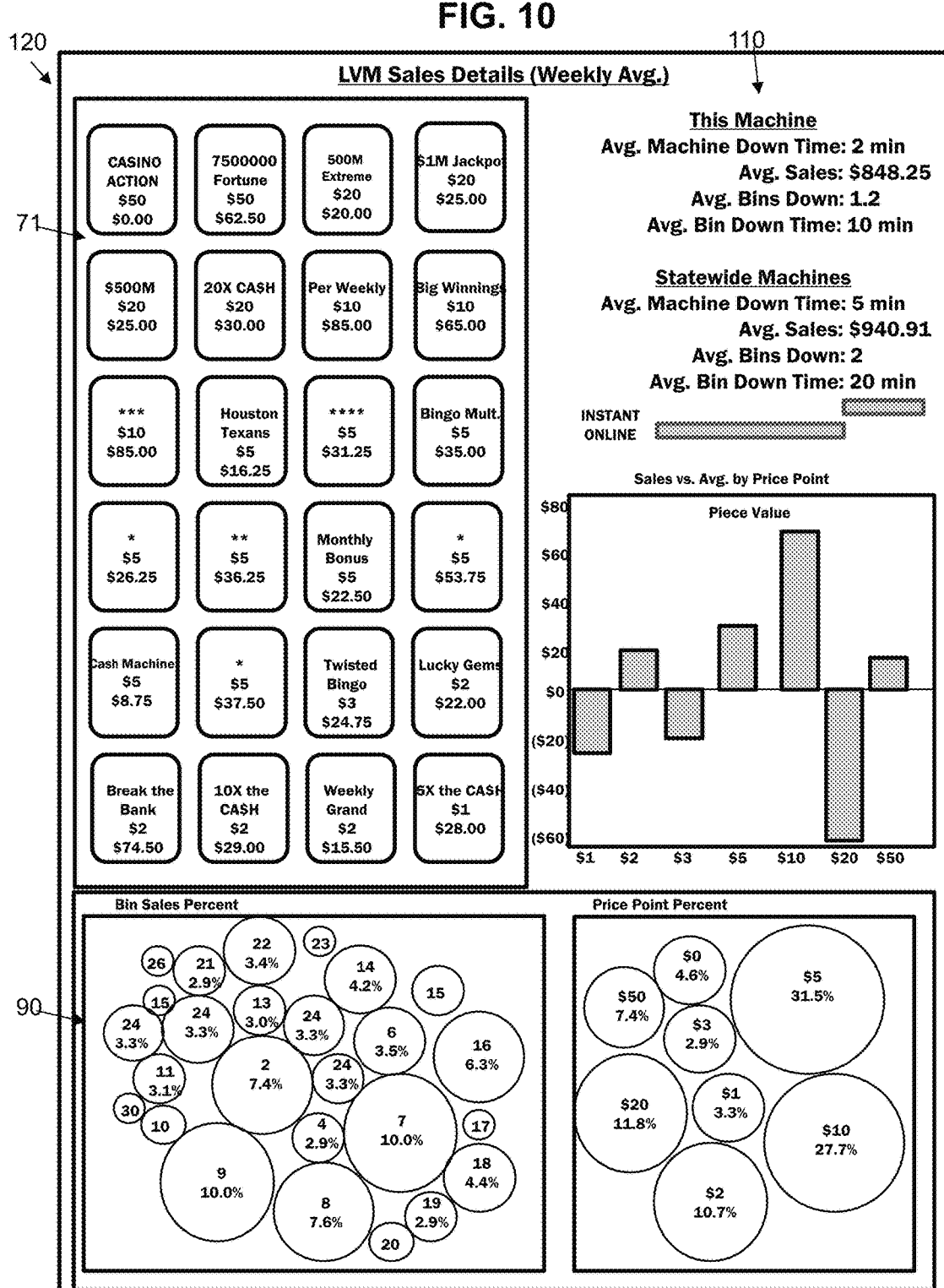

As shown in the exemplary administrative display 120 in FIG. 10, a combined interface display 120 can show multiple elements in combination, such as the displays 80, 90 and 110 of FIGS. 7 through 9.

Figure 11:
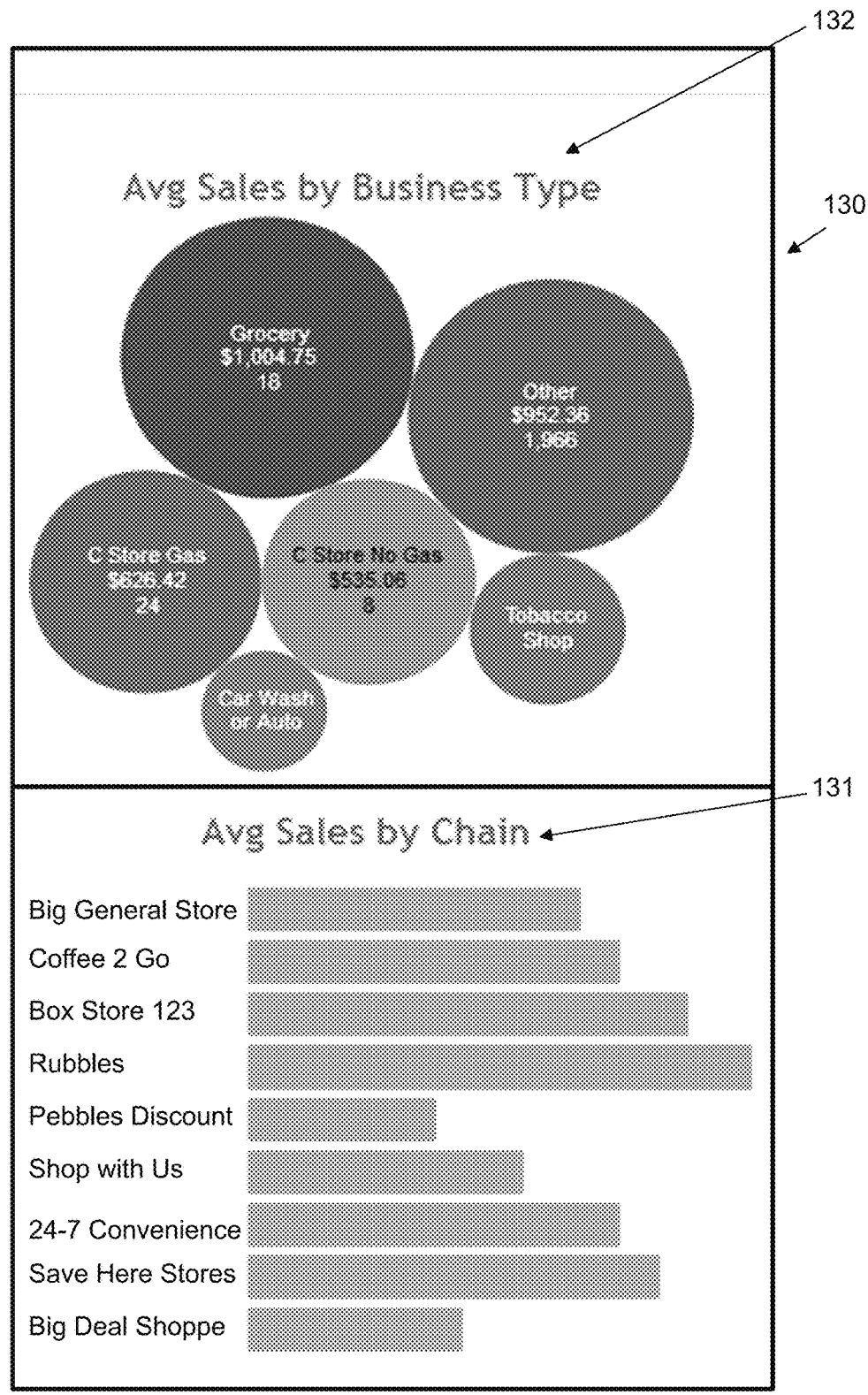
Figure 12:
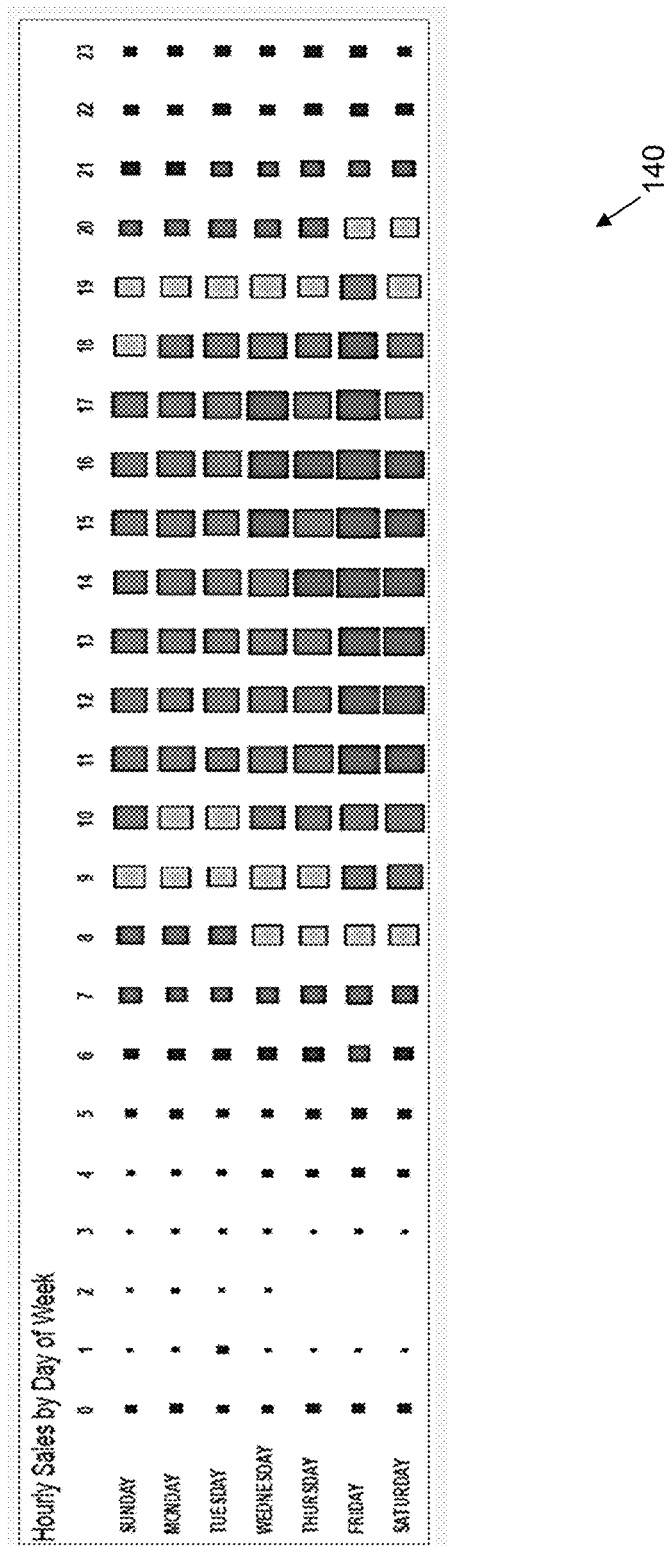
Figure 13:
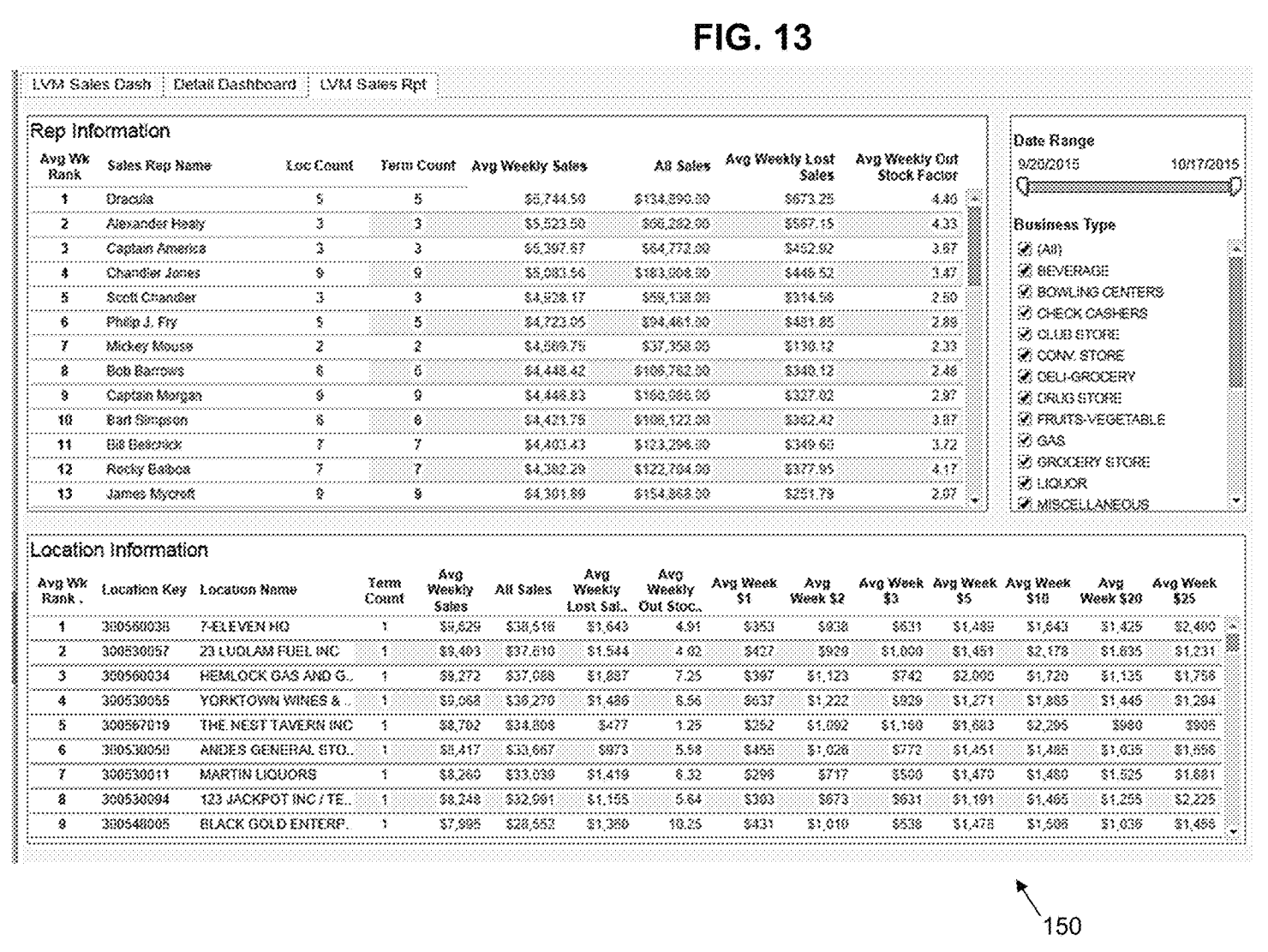

As shown in the exemplary administrative display 130 of FIG. 11, graphical representations of average sales by chain (e.g., at 131) and business type (e.g., at 132) can be shown. As shown in the exemplary administrative display 140 of FIG. 12, graphical representations of hourly sales by day of the week can be shown. As shown in the exemplary administrative display 150 of FIG. 13, graphical representations of sales reports can be shown. As shown in the exemplary administrative display 160 of FIG. 14, graphical representations of game penetration can be shown, including games determined to be missing at specific facilities, among other things. Such information can assist with monitoring retailer compliance, for example.

Using the data within the various embodiments of the system of the present disclosure and state lotteries' pre-approved key performance indicator (KPI) benchmarks, embodiments of the system can generate Aggregated Chain Performance Scorecards that jurisdictions can present to retailers during their regular performance review and strategy planning sessions, for example. Such reports can be segmented at the LVM level, for example. This approach provides a unified template to facilitate communication between jurisdictions and retail chains needed to create effective joint plans for lottery sales optimization.

Analysis from the various embodiments of the system of the present disclosure can be made available to state jurisdictions in a secure and confidential manner. For example, a state lottery can view national high level statistical information and can also drill down into detailed sales information within their own, and optionally only within their own, jurisdiction. Each set of analysis can be built to contain the detailed data for only that one lottery jurisdiction and no other. Each set can also be self-contained in that it does not require any connection back to the data source so there is no possibility to somehow accidentally or purposefully view the details of another lottery jurisdiction. The delivery of the set of analysis to the lottery jurisdiction can be done via secure method conforming to all security processes and protocols, in accordance with various embodiments of the present disclosure.

In various embodiments, the analytical output can to be linked to player data to understand, for example, where the players play, what games they play, whether they play in store or online, etc. In this way, the system of the present disclosure assists in increasing player loyalty and player advocates for the attraction of additional players. In various embodiments, the system of the present disclosure can employ statistical computing and graphics software programming in order to perform data analytics. Such programming can be developed using various software such as R, also called GNU S, for example. Models can be built and/or programmed in accordance with the present disclosure and run directly against multi-jurisdictional data, for example, where output of the predictive models can be viewed by the same visualization tool described in accordance herein.

In operation, a lottery operator or service provider can ship physical ticket products to a retailer for positioning within an LVM device 15. The ticket products can be arranged in packs, where each pack corresponds to a specific game. Each ticket pack includes one or more codes, which can be printed on packaging, leading tabs or otherwise associated with the pack. A ticket internal entry apparatus, such as a scanner or integrated computing device, receives ticket pack data input to activate the pack and/or inform the central server 20 that the pack is being loaded in the machine. For example, a scanner on or in communication with the LVM device 15 scans the ticket pack code(s), whereupon the LVM device 15 knows and associates the ticket pack with a ticket representation icon for display on the LVM device display. Alternatively, a computing device associated with the LVM device 15 can be used to accept manual entry of data (e.g., a code or number) that indicates a specific ticket pack is being loaded into the device 15. At the same time, the LVM device communicates to server 20 and/or server 22 that the specific ticket pack loaded into the LVM device is available for purchase. The same process is repeated for different ticket packs until the LVM device is fully loaded with new tickets. In various embodiments, the planogram or alignment scheme for the ticket display is delivered by the server to the LVM device. Such delivery can include physical delivery to the retailer, who can then establish the desired planogram on the LVM device display. The planogram can also be communicated from the server 20 to the LVM device electronically, whereupon the LVM device automatically displays the desired planogram on the device display. In aspects of the system, the LVM device is prevented from displaying any ticket representations where the corresponding ticket pack code has not been scanned. In this way, the LVM device will not falsely represent that a specific game is available for purchase when, in fact, the corresponding ticket pack has not been loaded into the device.

Once the ticket packs are loaded and the display planogram is programmed, the LVM device can be used by ticket purchasers, and purchasing and ticket pack data is collected by the LVM device and transmitted to the central server. In various embodiments, the user's ticket selection and payment selection are sent to the central server. While the central server can include payment processing component 36, it will be appreciated that payment processing can occur locally at the establishment where the LVM device resides. Purchasing and/or ticket pack parameter data is collected regarding the number of tickets sold in each pack and the number of tickets sold at each price point. Further, ticket pack parameter data can include information indicating that a ticket pack code has been scanned, for example, that the ticket pack has been loaded and is 100% available, that the ticket pack has become depleted and is 0% available, and that the ticket pack has had a given percentage of tickets sold. In various embodiments, the scanner can scan a code at the end of the ticket pack to indicate that the ticket pack is depleted and is being replaced. Alternatively, when a ticket pack is depleted, a computing device associated with the LVM device can be employed to manually designate the depleted ticket pack information. Ticket pack parameter data can be collected by the scanner or by the LVM device. Other status parameter data can be collected, including mechanical and/or device operational data, such as whether the machine is currently functional, whether one or more bins are operational or offline and whether associated device software is operating adequately, for example. Such status data can be used in determining how to present ticket game icons on the device display for purchase.

Regardless of whether a ticket pack has been depleted, a user viewing a user interface such as shown in any of FIGS. 5 through 14 may determine that a re-alignment of the ticket representations in the planogram displayed on a given LVM device is necessary or desirable. For instance, the central server may receive data from the device that a ticket pack has become depleted. As another example, the central server may receive data from the LVM device indicating that the $5 tickets are selling exceptionally well, whereas the tickets priced higher than $5 are not selling well. In such cases, the user can retrieve pre-set planogram designs from database 52 and select an option from the pre-set planogram designs for use on a given LVM device. Alternatively, the user can manually move ticket representation icons around to generate a new alignment (i.e., planogram) of ticket representations. As a further alternative, the user can request the server to automatically generate a new alignment based on the different ticket representations currently in place. In such option, the server can operate an algorithm to assess different arrangement options based upon such factors as maximizing revenue, managing inventory or other desired goal. In such ways, the server determines an optimal re-aligned planogram for presenting to the user. In various embodiments, the user can receive an option to accept or reject the suggested re-alignment, whereas in other embodiments, the determined alignment is implemented without user review. Regardless, once a new alignment of ticket representations is established, it is communicated to the LVM device for executing on the LVM device display. Thus, without changing ticket packs in and out of bins in the LVM device, the ticket representations on the device display can be re-arranged and customized remotely. Additional changes to ticket alignments can occur in a similar fashion. Ultimately, a given LVM device may incur several display changes without any physical change to the ticket packs loaded in the machine. As ticket packs are depleted, they are replaced. In various embodiments, the retailer replaces depleted ticket packs with new ticket packs showing the same game and price point. In other embodiments, instructions are provided by the central server as to which ticket packs should be loaded into a given LVM device once a previously loaded ticket pack is depleted.

It will be appreciated that the operative format of the original and subsequent ticket alignments can be a grid, as indicated in FIGS. 6 and 7, for example, wherein individual ticket offerings are presented in a respective pre-determined grid cell. It will further be appreciated that alignment schemes for the planogram can be generated based upon past or current total sales at a specific LVM device, past or current individual ticket sales at a specific LVM device, past or current ticket sales at a given price point at a specific LVM device, past or current sales at a group of LVM devices in a single jurisdiction or multiple jurisdictions, past or current sales at one or more LVM devices that are associated with a specific retailer, business type, chain, day of week, time of day, month of year, and so forth.

In embodiments where the system includes multiple LVM devices 15 in communication with the server 20, it will be appreciated that such devices can be initially loaded with the same ticket packs and the same alignment scheme, or such devices can be loaded with different ticket packs and different alignment schemes. Further, even if multiple LVM devices are initialized with the same alignment scheme, the system or a user may determine that subsequent alignment schemes for the multiple devices should be different.

Over time, individual and/or multiple LVM devices can be monitored for performance, and retailer compliance can be measured, including compliance with deploying ticket packs to LVM devices as instructed according to desired alignment schemes.

It will be appreciated that all of the disclosed methods and procedures herein can be implemented using one or more computer programs or components. These components may be provided as a series of computer instructions on any conventional computer-readable medium, including RAM, SATA DOM, or other storage media. The instructions may be configured to be executed by a processor which, when executing the series of computer instructions, performs or facilitates the performance of all or part of the disclosed methods and procedures.

Unless otherwise stated, devices or components of the present disclosure that are in communication with each other do not need to be in continuous communication with each other. Further, devices or components in communication with other devices or components can communicate directly or indirectly through one or more intermediate devices, components or other intermediaries. Further, descriptions of embodiments of the present disclosure herein wherein several devices and/or components are described as being in communication with one another does not imply that all such components are required, or that each of the disclosed components must communicate with every other component. In addition, while algorithms, process steps and/or method steps may be described in a sequential order, such approaches can be configured to work in different orders. In other words, any ordering of steps described herein does not, standing alone, dictate that the steps be performed in that order. The steps associated with methods and/or processes as described herein can be performed in any order practical. Additionally, some steps can be performed simultaneously or substantially simultaneously despite being described or implied as occurring non-simultaneously.

It will be appreciated that algorithms, method steps and process steps described herein can be implemented by appropriately programmed general purpose computers and computing devices, for example. In this regard, a processor (e.g., a microprocessor or controller device) receives instructions from a memory or like storage device that contains and/or stores the instructions, and the processor executes those instructions, thereby performing a process defined by those instructions. Further, programs that implement such methods and algorithms can be stored and transmitted using a variety of known media. At a minimum, the memory includes at least one set of instructions that is either permanently or temporarily stored. The processor executes the instructions that are stored in order to process data. The set of instructions can include various instructions that perform a particular task or tasks. Such a set of instructions for performing a particular task can be characterized as a program, software program, software, engine, module, component, mechanism, or tool. Common forms of computer-readable media that may be used in the performance of the system and method of the present disclosure include, but are not limited to, RAM, USB drive or any other memory chip or cartridge, or any other medium from which a computer can read. The term "computer-readable medium" when used in the present disclosure can refer to any medium that participates in providing data (e.g., instructions) that may be read by a computer, a processor or a like device. Such a medium can exist in many forms, including, for example, non-volatile media, volatile media, and transmission media. Non-volatile media include, for example, USB and other persistent memory. Volatile media can include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications.

Various forms of computer readable media may be involved in carrying sequences of instructions associated with the present disclosure to a processor. For example, sequences of instruction can be delivered from RAM to a processor, carried over a wireless transmission medium, and/or formatted according to numerous formats, standards or protocols, such as Transmission Control Protocol/Internet Protocol (TCP/IP), Wi-Fi, Bluetooth, GSM, CDMA, EDGE and EVDO. Where databases are described in the present disclosure, it will be appreciated that alternative database structures to those described, as well as other memory structures besides databases may be readily employed. The drawing figure representations and accompanying descriptions of any exemplary databases presented herein are illustrative and not restrictive arrangements for stored representations of data. Further, any exemplary entries of tables and parameter data represent example information only, and, despite any depiction of the databases as tables, other formats (including relational databases, object-based models and/or distributed databases) can be used to store, process and otherwise manipulate the data types described herein. Electronic storage can be local or remote storage, as will be understood to those skilled in the art. Appropriate encryption and other security methodologies can also be employed by the system of the present disclosure, as will be understood to one of ordinary skill in the art.

The invention may be embodied in other specific forms without departing from the spirit or essential characteristics thereof. The present embodiments are therefore to be considered in all respects as illustrative and not restrictive, the scope of the invention being indicated by the claims of the application rather than by the foregoing description, and all changes which come within the meaning and range of equivalency of the claims are therefore intended to be embraced therein.

What is claimed is:

1. A lottery vending machine customization system, comprising:
   a local client lottery vending machine comprising a payment collection apparatus, display device, and a plurality of lottery ticket bins;
   a ticket internal entry apparatus in communication with the local client lottery vending machine; and
   a central server configured to communicate with the local client lottery vending machine over a network, the central server configured to:
   responsive to receipt of a first status parameter from the local client lottery vending machine, determine a first planogram based on the first status parameter,
   send the first planogram to the local client lottery vending machine for display on the display device, responsive to receipt of a second different status parameter from the local lottery vending machine, determine a second different planogram based on the second status parameter, and send the second different planogram to the local client lottery vending machine for display on the display device, wherein one of the first planogram and the second different planogram comprises a planogram arrangement independent from a physical ticket arrangement in the plurality of lottery ticket bins.

2. The system of claim 1, wherein the first planogram comprises a grid having pre-determined grid locations, and wherein each pre-determined grid location includes an individual ticket offering.

3. The system of claim 1, wherein one of the first planogram and the second different planogram is organized according to ticket sales associated with the local client lottery vending machine.

4. The system of claim 1, wherein one of the first planogram and the second different planogram is organized according to ticket sales associated with individual game tickets sold at the local client lottery vending machine.

5. The system of claim 1, wherein the local client lottery vending machine includes a plurality of vending machines within a lottery jurisdiction, and wherein one of the first planogram and the second different planogram is organized according to ticket sales associated with the plurality of vending machines.

6. The system of claim 1, wherein the ticket internal entry apparatus is a scanner.

7. The system of claim 1, wherein the ticket internal entry apparatus is a device-level input apparatus having a visual display.

8. The system of claim 1, wherein one of the first status parameter and the second different status parameter is a ticket pack status parameter having a status of one of: fully sold, unsold, and a percentage sold.

9. The system of claim 1, wherein one of the first status parameter and the second different status parameter is an operational status parameter reflecting a physical status associated with the local client lottery vending machine.

10. The system of claim 1, wherein the central server receives from the local client lottery vending machine an indication of a ticket selection from the display device and an indication of a payment from the payment collection apparatus.

11. The system of claim 1, wherein the central server receives an indication from the ticket internal entry apparatus of a new ticket pack offered for sale by the local client lottery vending machine.

12. The system of claim 1, further including a user interface in communication with the central server for generating one of the first planogram and the second different planogram.

13. The system of claim 12, wherein one of the first planogram and the second different planogram is generated by the user interface receiving a selection of a pre-set alignment scheme.

14. The system of claim 12, wherein one of the first planogram and the second different planogram is generated by the user interface receiving a manually input planogram arrangement of individual ticket game offerings.

15. The system of claim 12, wherein one of the first planogram and the second different planogram is generated by receiving a request to automatically generate an optimal planogram arrangement.

16. A lottery vending machine customization system, comprising:

a first local client lottery vending machine comprising a first payment collection apparatus, a first display device configured to display a first planogram of ticket offerings, and a plurality of first lottery ticket bins;

a first ticket internal entry apparatus in communication with the first local client lottery vending machine;

a second local client lottery vending machine comprising a second payment collection apparatus, a second display device configured to display a second planogram of ticket offerings;

a second ticket internal entry apparatus in communication with the second local client lottery vending machine; and a central server configured to communicate with the first and second local client lottery vending machines over a network, the central server configured to:

responsive to receipt of a first status parameter from the first local client lottery vending machine, determine a revised first planogram based on the first status parameter, send the first revised planogram to the first local client lottery vending machine to replace the first planogram and display the first revised planogram on the first display device, wherein one of the first planogram and the first revised planogram comprises a first planogram arrangement independent from a first physical ticket arrangement in the plurality of first lottery ticket bins, responsive to receipt of a second different status parameter from the second local client lottery vending machine, determine a revised second planogram based on the second different status parameter, and send the second revised planogram to the second local client lottery vending machine to replace the second planogram and display the second revised planogram on the second display device, wherein one of the second planogram and the second revised planogram comprises a second planogram arrangement independent from a second physical ticket arrangement in the plurality of second lottery ticket bins.

17. The system of claim 16, wherein the first planogram and the second planogram are the same.

18. The system of claim 16, wherein the first revised planogram and the second revised planogram are different.

19. The system of claim 16, wherein one of the first planogram and the second planogram is based upon prices of the ticket offerings.

20. The system of claim 16, wherein one of the first planogram and the second planogram is automatically generated.

21. The system of claim 16, wherein one of the first revised planogram and the second revised planogram is manually generated.

22. A method for customizing a lottery vending machine display, comprising:

sending, by a central server to a local client lottery vending machine in communication with the central server, a first planogram of ticket offerings, wherein the local client lottery vending machine comprises a ticket internal entry apparatus, display device, and a plurality of lottery ticket bins;

displaying, by the display device of the local client lottery vending machine, the first planogram of ticket offerings;

receiving, by the central server from the local client lottery vending machine, a status parameter for a ticket offering associated with the first planogram;

sending, by the central server to the local client lottery vending machine, a second different planogram of ticket offerings; and displaying, by the display device of the local client lottery vending machine, the second different planogram of ticket offerings.

* * * * *